US010299225B2

United States Patent
Gulati et al.

(10) Patent No.: US 10,299,225 B2
(45) Date of Patent: May 21, 2019

(54) USER EQUIPMENT MANAGEMENT LIMITING TRANSMIT OUTPUT POWER IN PROTECTION ZONES

(71) Applicant: QUALCOMM Incorporated, San Diego, CA (US)

(72) Inventors: Kapil Gulati, Dover, DE (US); Tien Viet Nguyen, Bridgewater, NJ (US); Gene Fong, San Diego, CA (US); Shailesh Patil, Raritan, NJ (US); Sudhir Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/668,296

(22) Filed: Aug. 3, 2017

(65) Prior Publication Data

US 2018/0098292 A1 Apr. 5, 2018

Related U.S. Application Data

(60) Provisional application No. 62/402,750, filed on Sep. 30, 2016.

(51) Int. Cl.
*H04W 52/30* (2009.01)
*H04W 52/36* (2009.01)
(Continued)

(52) U.S. Cl.
CPC ....... *H04W 52/367* (2013.01); *H04W 52/243* (2013.01); *H04W 52/267* (2013.01); *H04W 52/283* (2013.01); *H04B 7/208* (2013.01); *H04B 7/212* (2013.01); *H04B 15/06* (2013.01); *H04W 52/50* (2013.01)

(58) Field of Classification Search
CPC ............. H04W 52/367; H04W 52/146; H04W 52/365; H04W 88/06; H04W 72/0413; H04W 72/1215; H04W 52/243; H04W 52/34; H04W 72/0473; H04W 16/14; H04W 24/10; H04W 84/12; H04W 52/18; H04W 52/38; H04W 52/24;
(Continued)

(56) References Cited

U.S. PATENT DOCUMENTS

2011/0256884 A1* 10/2011 Kazmi ................. H04W 48/04 455/456.1
2012/0051315 A1* 3/2012 Wang ................. H04W 72/082 370/329

* cited by examiner

*Primary Examiner* — Philip Sobutka
(74) *Attorney, Agent, or Firm* — Arent Fox LLP

(57) ABSTRACT

A method, computer-readable medium, and apparatus operate to reduce or eliminate interference with one or more other communication systems having specific transmission requirements within a specific geographic area. For example, aspects operate by determining that a user equipment (UE) is in a protection zone where additional transmission requirements apply. The additional transmission requirements enable coexistence with one or more other communication systems in the protection zone. The UE may identify, based on being in the protection zone and a coexistence mode, one or more transmit emission limit requirements to be met. The UE may identify, based on being in the protection zone and the coexistence mode, one or more maximum transmit power requirements to be met. The UE may configure a transmit output power, at which the UE can meet the one or more transmit emission limit requirements and the one or more maximum transmit power requirements.

26 Claims, 3 Drawing Sheets

(51) Int. Cl.
*H04W 52/24* (2009.01)
*H04W 52/26* (2009.01)
*H04W 52/28* (2009.01)
H04B 7/208 (2006.01)
H04B 7/212 (2006.01)
H04B 15/06 (2006.01)
H04W 52/50 (2009.01)

(58) Field of Classification Search
CPC . H04W 52/283; H04W 52/06; H04W 52/241; H04W 52/03
USPC .......................................................... 455/522
See application file for complete search history.

USER EQUIPMENT MANAGEMENT LIMITING TRANSMIT OUTPUT POWER IN PROTECTION ZONES

CLAIM OF PRIORITY UNDER 35 U.S.C. § 119

This application claims priority to U.S. Provisional Application No. 62/402,750, titled "USER EQUIPMENT TRANSMISSION MANAGEMENT FOR DYNAMICALLY VARYING TRANSMISSION EMISSION REQUIREMENTS," filed Sep. 30, 2016, which is assigned to the assignee hereof, and incorporated herein by reference in its entirety.

INTRODUCTION

Aspects of the present disclosure relate generally to wireless communications systems, and more particularly, to apparatus and methods of managing transmissions of a user equipment to meet dynamically varying transmission emission requirements in wireless communications systems.

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase. In response, a 5th Generation (5G) New Radio (NR) communications technology, used in a wide range of spectrum, is envisaged to expand and support diverse usage scenarios and applications with respect to current mobile network generations.

One usage scenario supported by LTE and/or NR communication technology relates to intelligent transportation systems (ITS), including vehicle-to-vehicle (V2V) and/or vehicle-to-X (where X represents some other device or some other technology) communications. In some instances, communications associated with ITS can interfere with other communication systems, such as road tolling stations. As such, improvements in communications in such scenarios may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method related to managing transmissions of a user equipment, e.g., to reduce or eliminate interference with one or more other communication systems having specific transmission requirements within a specific geographic area, is provided. The method includes determining, by a processor of the UE, that the UE is in a protection zone where additional transmission requirements apply, the additional transmission requirements enabling coexistence with one or more other communication systems in the protection zone. The method includes identifying, by the processor and based on being in the protection zone and a coexistence mode, one or more transmit emission limit requirements to be met. The method includes identifying, by the processor and based on being in the protection zone and the coexistence mode, one or more maximum transmit power requirements to be met. The method includes configuring, by the processor, a transmit output power, at which the UE can meet the one or more transmit emission limit requirements and the one or more maximum transmit power requirements.

In another example, a user equipment apparatus includes a transceiver, a memory configured to store instructions, and one or more processors communicatively coupled with the transceiver and the memory. The one or more processors may be configured to determine that the UE is in a protection zone where additional transmission requirements apply, the additional transmission requirements enabling coexistence with one or more other communication systems in the protection zone. The one or more processors may be configured to identify, based on being in the protection zone and a coexistence mode, one or more transmit emission limit requirements to be met. The one or more processors may be configured to identify, based on being in the protection zone and the coexistence mode, one or more maximum transmit power requirements to be met. The one or more processors may be configured to configure, by the processor, a transmit output power, at which the UE can meet the one or more transmit emission limit requirements and the one or more maximum transmit power requirements.

According to a further example, a UE may include means for determining that the UE is in a protection zone where additional transmission requirements apply, the additional transmission requirements enabling coexistence with one or more other communication systems in the protection zone. The UE may include means for identifying, based on being in the protection zone and a coexistence mode, one or more transmit emission limit requirements to be met. The UE may include means for identifying, based on being in the protection zone and the coexistence mode, one or more maximum transmit power requirements to be met. The UE may include means for configuring a transmit output power, at which the UE can meet the one or more transmit emission limit requirements and the one or more maximum transmit power requirements.

In yet another example, a computer-readable medium stores computer-executable code executable by one or more processors to configure a transmit output power of a UE. The computer-readable medium may include code to determine that the UE is in a protection zone where additional transmission requirements apply, the additional transmission requirements enabling coexistence with one or more other communication systems in the protection zone. The computer-readable medium may include code to identify, based on being in the protection zone and a coexistence mode, one or more transmit emission limit requirements to be met. The computer-readable medium may include code to identify, based on being in the protection zone and the coexistence mode, one or more maximum transmit power requirements to be met. The computer-readable medium may include code to configure a transmit output power, at which the UE can meet the one or more transmit emission limit requirements and the one or more maximum transmit power requirements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
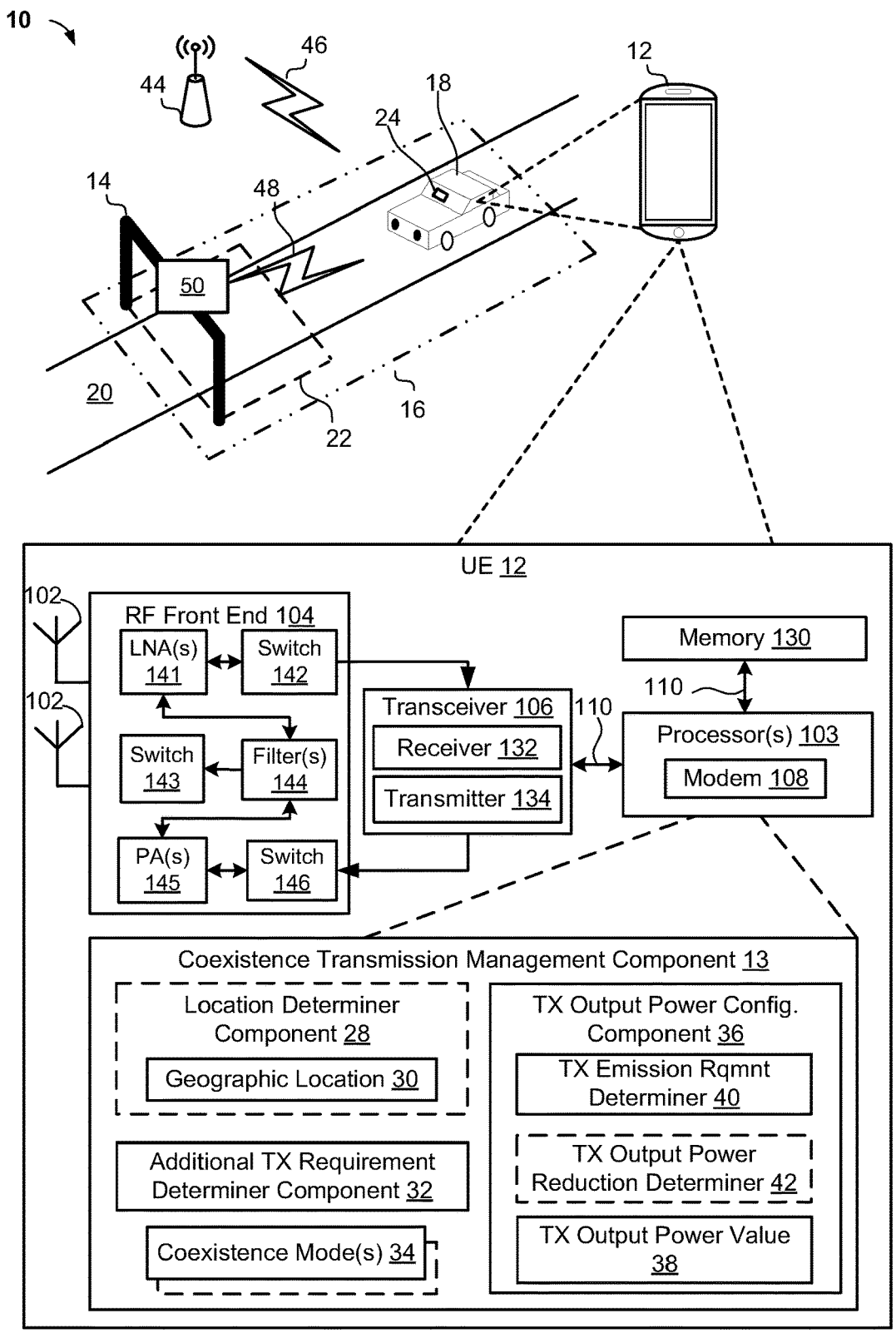
FIG. 1 is a schematic diagram of one implementation of a wireless communication system including a UE having a coexistence transmission manager component configured to reduce or eliminate interference with one or more other communication systems having specific transmission requirements within a specific geographic area.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Additionally, the term "component" as used herein may be one of the parts that make up a system, may be hardware, firmware, and/or software, and may be divided into other components.

Described herein are various aspects related to a wireless communications system (e.g., LTE, 5G NR), in particular, to apparatus and methods of managing transmissions of a user equipment (UE) to meet dynamically varying transmission emission requirements associated with a protection zone within one or more areas of a geographic region. Specifically, the present disclosure includes a UE having a coexistence transmission management component that is configured to determine, based on the UE being within a protection zone, if additional transmission requirements apply to enable coexistence with one or more other communication systems in the protection zone. Further, the coexistence transmission management component is configured to identify transmit emission limit requirements and maximum transmit power requirements to be met based on the geographic location of the UE and a coexistence mode associated with the one or more other communications systems. Additionally, the coexistence transmission management component is operable to configure a transmit output power, u at which the UE can meet the emission requirements.

In one aspect, the coexistence transmission management component is configured to determine, based on the transmit emission limit requirements and the maximum transmit power requirements, an allowed maximum transmit output power reduction (which may be referred to as D-MPR) that can be utilized by the UE to meet the emission requirements. In an alternative or additional aspect, a total power backoff allowance for the UE is a sum of a maximum power reduction (MPR; e.g., as defined by an LTE specification)+ an additional MPR (A-MPR; as defined by an LTE specification)+the allowed maximum transmit output power reduction (as defined herein).

In one aspect, the determination of applicability of additional transmission requirements is based on additional information provided by a serving eNodeB and/or is preconfigured in the UE.

For example, one implementation of this disclosure relates to managing transmissions of a UE operating within an intelligent transportation system (ITS), such as for V2V or V2X communications, to enable coexistence with a Transport and Traffic Telematics (TTT) system (e.g., a road tolling system, also known as a European Committee for Standardization (CEN) dedicated short range communication (DSRC) road side unit (RSU)). In Europe (Region 1), 5855-5925 MHz is allocated for ITS services and has to coexist with CEN DSRC RSUs operating in 5795-5815 MHz. Due to the short separation of the frequency range between the ITS band and CEN DSRC band, there are tighter emission requirements for ITS stations to avoid harmful interference to CEN DSRC RSUs. CEN DSRC communication is localized around the RSUs, also known as road tolling stations, such as in a tolling zone associated with each RSU (see, e.g., tolling zone 22 associated with RSU 14 in FIG. 1).

For this reason, each tolling zone is associated with a protection zone (see, e.g., protection zone 16 in FIG. 1) surrounding the RSU, where the protection zone is designed to protect the RSU from harmful interference from ITS stations. The ITS station then operates in two modes: normal mode outside the protection zone and coexistence mode within the protection zone. In normal mode, there are no additional requirements on the ITS station required for coexistence with CEN DSRC. In coexistence mode, the ITS station has to meet tighter requirements to avoid interference to CEN DSRC. Further, different coexistence modes are possible based on transmit power and transmit duty cycle constraints:

In normal mode, the emission requirement in CEN DSRC band is −30 dBm/MHz, and there are no further constraints on duty-cycle/transmit power.

In coexistence mode: From ETSI TS 102 792, Table 5.3:

TABLE 5.3

| | Coexistence modes | | | |
|---|---|---|---|---|
| Coexistence mode | ITS output power level in the frequency range 5 855 MHz to 5 925 MHz (dBm EIRP) | ITS unwanted emissions in the frequency range 5 795 MHz to 5 815 MHz (dBm/MHz EIRP) | $T_{on}$ time | $T_{off}$ time |
| A | ≤10 | ≤−65 | no limit | no limit |
| B | ≤10 | ≤−45 | ≤1 ms | ≥50 ms |
| C | ≤33 | ≤−30 | ≤1 ms | equation 5.1 |
| D | ≤33 | ≤−30 | 1 ms to 7 ms | equation 5.2 |

In view of the foregoing, problems associated with ITS stations complying with CEN DSRC are summarized as follows:

1. ITS stations have to meet the tighter requirements for coexistence with CEN DSRC.
2. The requirements are regional (Europe).
3. The requirements are dynamic, e.g. a car driving through the road tolling station will have no additional requirements when far from the tolling station, then have tighter requirements when in the protection zone, and then again back to normal mode when it moves away.
4. The requirements in protection zone further depend on the coexistence mode being used by the UE (i.e. mix of emission requirements, max transmit (tx) power, and duty cycle).

In LTE, regional requirements that are tighter than the general requirements are indicated to the UE using NS (network signaling; e.g., an NS value). The eNodeB indicates the NS value to use in the system information block (SIB), and the NS value corresponds to a set of tighter emission requirements defined in the specification (TS 36.101). To meet the tighter requirements, the UE may be allowed to use A-MPR (additional maximum output power reduction) as specified in the specification. Thus the NS value indicates to the UE the tighter emission requirement, as well as the A-MPR allowance for that case to help meet those tighter requirements.

The current NS signaling/A-MPR approach of LTE does not work in a system having hyper-localized and hyper-dynamic transmission requirements, such as but not limited to the requirements for coexistence with CEN DSRC in an ITS.

For example, the current LTE approach fails to provide an indication of the additional requirements for coexistence with CEN DSRC. The intention for NS signaling (and the associated A-MPR allowance) is to meet regional requirements that are more static in nature (e.g. applicable over a wide region) and not expected to dynamically become applicable based on distance from RSUs/tolling stations (e.g., in a protection area on an order of 100 m from a tolling station). Because of the static nature of regional LTE requirements, the applicability can be signaled to the UE from a serving eNB or can be pre-configured in a subscriber identification module (e.g., a universal SIM) with the associated geographical area. However, the same approach does not work efficiently for the RSU/tolling station case due the hyper-localized and hyper-dynamic nature of the transmission requirements.

Further, for example, the current LTE approach fails to consider a mix of Duty-Cycle+Emissions+transmit (Tx) output power. For instance, regional requirements covered in LTE under NS relate to fixed emission requirements independent of the duty cycle of transmission. For the CEN DSRC coexistence case, Mode A is of that form. However, Modes B, C, D are also allowed where the emission requirements differ if the UE is transmitting at lower frequency, etc. So the emission requirement to meet also depends on the UE implementation of the coexistence mode, and is not fixed as required with NS.

Accordingly, the present disclosure provides a UE with a coexistence transmission manager component to improve the performance of wireless communications, e.g., to reduce interference with other wireless communications such as but not limited to CEN DSRC.

One or more of the aspects described above may be performed or implemented in connection with the example implementations of FIGS. 1-3, which are described in more detail below.

Referring to FIG. 1, in an aspect, a wireless communication system 10 includes UE 12 having a coexistence transmission management component 13 to reduce or eliminate interference with one or more other communication systems having specific transmission requirements within a specific geographic area. For example, the one or more other communications systems may be a relatively short range communication system (e.g., as compared to a range of a wireless wide area network (WWAN)), such as a road side tolling station or road side unit (RSU) 14 operating according to the CEN DSRC standard (e.g., ETSI TS 102 792), including specific transmission requirements (e.g., ETSI TS 102 792, Table 5.3) in a protection zone 16 associated with RSU 14. For example, protection zone 16 may be an area surrounding RSU 14, including extending a distance (e.g., up to 100 m) in front of RSU 14. In this case, the "front" of RSU 14 may be defined as a direction from which a vehicle 18 traveling on a road 20 (across which RSU 14 is located) is approaching RSU 14. Protection zone 16 may be of any size and shape to provide an area of protection around a tolling zone 22 of RSU 14, e.g., in order to reduce interference with DSRC communications in tolling zone 22 between RSU 14 and a toll-related transponder 24 in vehicle 18. For example, tolling zone 22 may be an area that covers a width of road 20, and extends a suitable distance (e.g., 10 m) from the front of RSU 14 to enable toll-related communications to occur. In an implementation, the protection zone 16 may be defined by center coordinates and a radius. In another implementation, the protection zone 16 may be defined by a set of coordinates (e.g., 4) indicating the corners of the protection zone 16.

UE 12 may be movably located in and out of protection zone 16, such as when UE 12 is located within vehicle 18. Due to the relatively small size of the area of protection zone 16 and the velocity at which UE 12 may be moving into and out of protection zone 16, according to the present disclosure, coexistence transmission management component 13 of UE 12 may be configured to be particularly suited for highly localized and highly dynamic operation to allow UE 12 to meet the transmission requirements within protection zone 16.

In one implementation, for instance, coexistence transmission management component 13 may include one or more subcomponents for determining and configuring transmission parameters to meet coexistence requirements.

For example, coexistence transmission management component 13 may optionally include a location determiner component 28 configured to determine a geographic location 30 of UE 12. Location determiner component 28 may include, for example, a satellite-based and/or terrestrial-based global positioning system (GPS), which may be a part of coexistence transmission management component 13 or which may be a separate component on UE 12 and in communication with coexistence transmission management component 13.

Further, for example, coexistence transmission management component 13 may include an additional transmission requirement determiner component 32 configured to determine whether the UE 12 is in a protection zone where additional transmission requirements apply. The additional transmission requirements may enable coexistence with one or more other communication systems in the protection zone. For example, the additional transmission requirement determiner component 32 may determine, based on geographic location 30 of UE 12, if additional transmission requirements apply to enable coexistence with one or more other communication systems in geographic location 30 by determining whether the geographic location 30 is within a protection zone 16. For example, in an aspect, additional transmission requirement determiner component 32 may determine if geographic location 30 of UE 12 matches or falls within protection zone 16 of CEN DSRC RSU 14. When UE 12 is located within protection zone 16, then additional transmission requirement determiner component 32 is configured to identify the additional transmission requirements associated with protection zone 16, such as the coexistence requirements associated with one or more coexistence modes 34 defined in Table 5.3 of ETSI TS 102 792 for CEN DSRC systems. In an implementation, the additional transmission requirement determiner component 32 may include a computer-readable medium (e.g., memory 130) storing code executable by a processor (e.g., processor 103) to determine, based on geographic location 30 of UE 12, if additional transmission requirements apply to enable coexistence with one or more other communication systems in or near geographic location 30.

Further, coexistence transmission management component 13 may include a transmit output power configuration component 36 to dynamically configure UE transmission parameters, including a transmit output power value 38, when additional transmission requirement determiner component 32 determines that the UE 12 is within a protection zone where additional transmission requirements apply to enable coexistence with one or more other communication systems in geographic location 30.

For instance, transmit output power configuration component 36 may include a transmit emission requirement determiner component 40 configured to identify transmit emission requirements to be met in the protection zone 16. For example, the transmit output power configuration component 36 may identify transmit emission requirements based on geographic location 30 of UE 12 and coexistence mode 34 associated with the other communications system in the location. For example, transmit emission requirement determiner component 40 may be configured to identify transmit emission requirements based on one or more coexistence modes 34 defined in Table 5.3 of ETSI TS 102 792 for CEN DSRC systems. For example, a maximum allowed output power level may be based on an applicable coexistence mode. The transmit emission requirement determiner component 40 may determine an applicable coexistence mode 34 based on an intended transmission. For example, the transmit emission requirement determiner component 40 may determine whether an intended transmission complies with one or more of the coexistence modes based on previous transmission parameters or scheduling information for the transmission.

The transmit output power configuration component 36 may identify, based on the UE 12 being in the protection zone 16 and a coexistence mode, one or more transmit emission limit requirements to be met. For example, the transmit output power configuration component 36 may identify an emission limit on a particular frequency range, such as the 5794-5815 MHz band identified by ETSI TS 102 792 for CEN DSRC systems. The transmit output power configuration component 36 may identify, based on the UE 12 being in the protection zone 16 and the coexistence mode, one or more maximum transmit power requirements to be met. For example, the transmit output power configuration component 36 may identify a maximum transmission power. For example, the identified maximum transmission power may be a maximum output power level defined by ETSI TS 102 792 for CEN DSRC systems.

Also, for instance, transmit output power configuration component 36 may include a transmit output power reduction determiner component 42 configured to determine, based on the transmit emission requirements, an allowed maximum transmit output power reduction or backoff that can be utilized by UE 12 to meet the emission requirements.

Therefore, based on operation of the above-noted components, transmit output power configuration component 36 is operable to configure transmit output power value 38, using the backoff from a maximum output power greater than or equal to the allowed maximum transmit output power reduction or backoff, at which UE 12 can meet the emission requirements of geographic location 30, e.g., associated with protection zone 16 of CEN DSRC systems.

The coexistence transmission management component 13 and its subcomponents may include hardware, firmware, and/or software code executable by a processor for performing transmission power configuration and management operations. For example, the hardware may include, for example, a hardware accelerator, or specialized processor.

In some implementations, UE 12, may be in communication coverage of at least one network entity 44 (e.g., base station or eNB, or a cell thereof, in a 5G NR network) for providing UE 12 with access to a network, such as the Internet. In some aspects, multiple UEs including UE 12 may be in communication coverage with one or more network entities, including network entity 44. In an aspect, the network entity 44 may be a base station such an eNodeB/eNB in a 5G NR network. Also, network entity 44 may be a macrocell, picocell, femtocell, relay, Node B, mobile Node B, small cell, UE (e.g., communicating in peer-to-peer or ad-hoc mode with UE 12), WiFi router, short range communication (e.g., Bluetooth, Zigbee) device, or substantially any type of component that can communicate with UE 12 to provide wireless network access to the UE 12. Although various aspects are described in relation to a UMTS, LTE, or 5G NR network, similar principles may be applied in other wireless wide area networks (WWAN) and/or wireless local area networks (WLANS). The wireless network may employ a scheme where multiple base stations may transmit and/or receive signals on one or more channels. In an example, UE 12 may transmit and/or receive wireless communications to and/or from network entity 44. In an aspect, the network entity 44 may provide the UE 12 with information regarding the locations of protection zones 16 within the coverage area of the network entity 44. For example, the network entity 44 may broadcast the locations of protection zones 16 within a system information block (SIB) or transmit the locations in a configuration message.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device.

According to the present aspects, the UE 12 may include one or more processors 103 and a memory 130 that may define and/or operate in combination with a coexistence transmission management component 13 to perform the dynamic transmission configuration functions as described herein. For example, coexistence transmission management component 13 may be communicatively coupled to a transceiver 106, which may include a receiver 132 for receiving and processing RF signals and a transmitter 134 for processing and transmitting RF signals. The processor 103 may be coupled to the transceiver 106 and memory 130 via at least one bus 110.

The receiver 132 may include hardware, firmware, and/or software code executable by processor 103 for receiving data, the code comprising instructions and being stored in a memory (e.g., computer-readable medium). The receiver 132 may be, for example, a radio frequency (RF) receiver. In an aspect, the receiver 132 may receive signals 46 transmitted by network entity 44, such as control signals and data signals on one or more channels. For example, in an aspect, signals 46 may include a SIB having an NS value, as described above. Also, in an aspect, the receiver 132 may receive signals 48 transmitted by a transmitter 50 of RSU 14, where signals 48 may include identify RSU 14, protection zone 16, and/or one or more coexistence modes 34 and/or coexistence requirements associated with protection zone 16.

The transmitter 134 may include hardware, firmware, and/or software code executable by processor 103 for transmitting data, the code comprising instructions and being stored in a memory (e.g., computer-readable medium). The transmitter 134 may be, for example, an RF transmitter. Further, for example, transmitter 134 may operate using a transmit output power value 38 set by coexistence transmission management component 13 in the manner described herein.

In an aspect, the one or more processors 103 can include a modem 108 that uses one or more modem processors. The various functions related to coexistence transmission management component 13 may be included in modem 108 and/or processors 103. In an aspect, the various functions can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106.

Moreover, in an aspect, UE 12 may include an RF front end 104, which in some cases may also be considered to include transceiver 106, for receiving and transmitting radio transmissions. RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through antenna 102 via RF front end 104. In an aspect, transceiver 106 may be tuned to operate at specified frequencies such that UE 12 can communicate with, for example, network entity 44 or RSU 14. In an aspect, for example, modem 108 can configure transceiver 106 to operate at a specified frequency and power level based on the UE configuration of the UE 12 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 12 (e.g., RF front end 104, transceiver 106) to enable transmission and/or reception of signals based on a specified modem configuration. In an aspect, the modem configuration can be based on the mode of the modem 108 and the frequency band in use. In another aspect, the modem configuration can be based on UE configuration information associated with UE 12 as provided by the network, e.g., during cell selection and/or cell reselection.

UE 12 may further include memory 130, such as for storing data used herein and/or local versions of applications or coexistence transmission management component 13 and/or one or more of its subcomponents being executed by processor 103. Memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining coexistence transmission management component 13 and/or one or more of its subcomponents, and/or data associated therewith, when UE 12 is operating processor 103 to execute coexistence transmission management component 13 and/or one or more of its subcomponents. In another aspect, for example, memory 130 may be a non-transitory computer-readable storage medium.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 2:
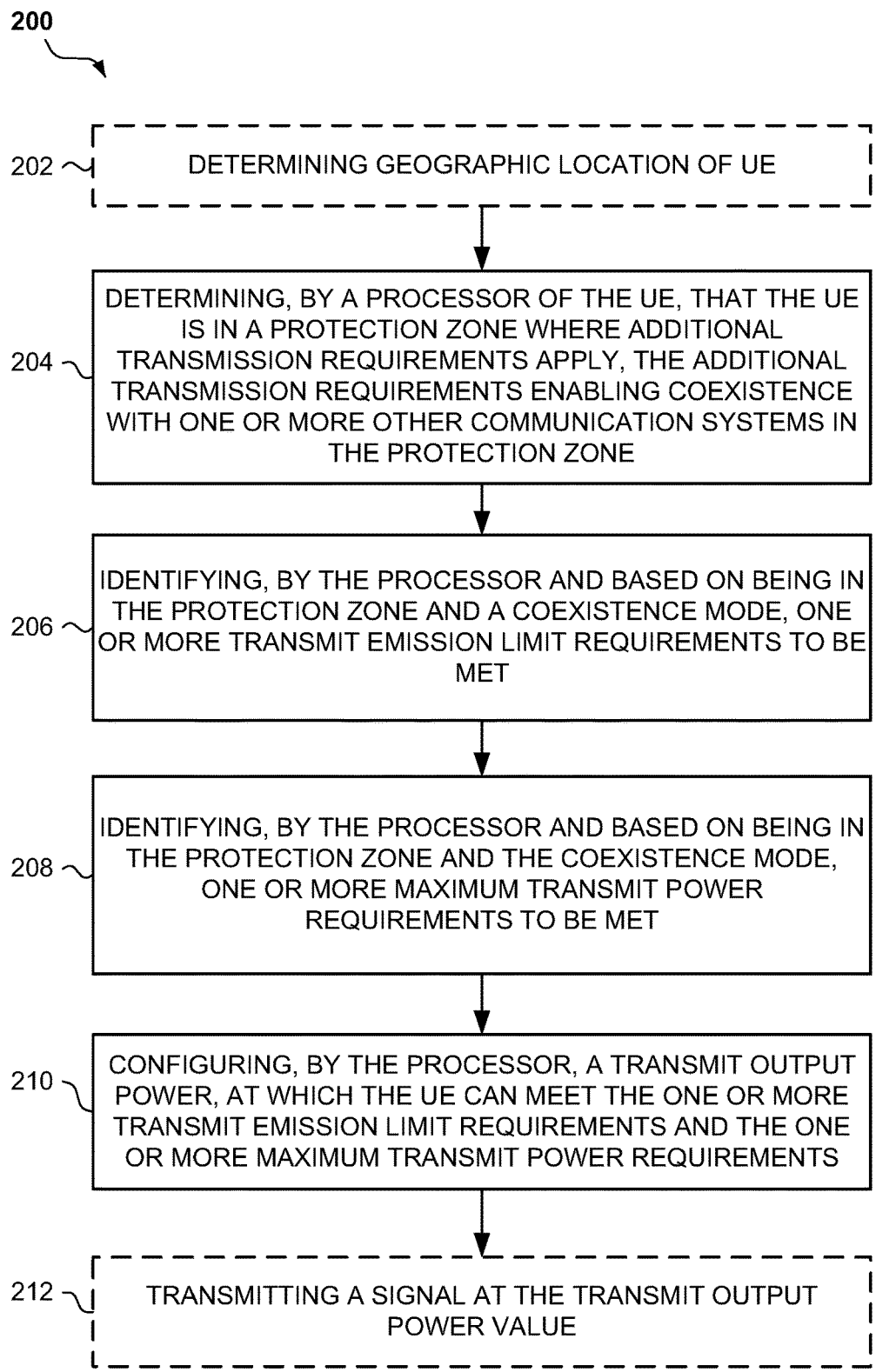
FIG. 2 is a flowchart of one implementation of a method of managing transmissions of a user equipment, such as may be performed by the UE of FIG. 1 executing the coexistence transmission manager component as described herein.

Referring to FIG. 2, in an operational aspect, a UE such as UE 12 (FIG. 1) may perform one or more aspects of a method 200 for transmission management. For example, one or more of the processors 103, the memory 130, the modem 108, and/or the coexistence transmission management component 13 of UE 12 may be configured to perform aspects of method 200.

In an aspect, at block 202, method 200 may optionally include determining a geographic location of the UE. For example, in an aspect, processor 103 executing coexistence transmission management component 13 is configured to determine geographic location 30 of UE 12. For instance, processor 103 and/or coexistence transmission management component 13 may include a GPS unit, or may be in communication with a GPS unit located elsewhere in UE 12, where the GPS unit is operable to compute geographic location 30 of UE 12 based on received satellite and/or terrestrial signals.

Further, at block 204, method 200 may include determining, by a processor of the UE, that the UE is in a protection zone where additional transmission requirements apply, the additional transmission requirements enabling coexistence with one or more other communication systems in the protection zone. For example, in an aspect, processor 103 executing coexistence transmission management component 13 and/or additional transmit (tx) requirement determiner component 32 is configured to determine, that the UE 12 is in a protection zone 16 where additional transmission requirements apply, the additional transmission requirements enabling coexistence with one or more other communication systems in the protection zone. For instance, in one implementation, additional transmit (tx) requirement determiner component 32 may include preconfigured location data that identifies one or more protection zones 16 having additional transmission requirements, and may compare geographic location 30 to the preconfigured location data to determine if a match exists (e.g., if geographic location 30 is within an area defined by preconfigured location data and/or within a predetermined distance of a location of an RSU 14). In another implementation, the determination of applicability of additional transmission requirements is based on additional information provided by network entity 44, such as a serving eNodeB. For example, the network entity 44 may provide locations of one or more protection zones 16 and/or additional transmission requirements associated with the one or more protection zones 16. In another implementation, the determination of applicability of additional transmission requirements may be based on additional information provided by a device of the one or more other communication systems. For example, the RSU 14 may transmit the signal 48 including an identification of the RSU 14 or a protection zone 16 associated therewith.

Also, at block 206, method 200 may include identifying, by the processor and based on being in the protection zone and a coexistence mode, one or more transmit emission limit requirements to be met. For example, in an aspect, processor 103 executing coexistence transmission management component 13 and/or transmit output power configuration component 36, including transmit emission requirement determiner component 40, is configured to determine transmit emission requirements to be met based on based on being in the protection zone 16 and a coexistence mode 34 associated with the one or more other communications systems, e.g., CEN DSRC RSU 14, at the location. For example, transmit emission requirement determiner component 40 may identify one or more coexistence modes 34 as defined by ETSI TS 102 792, and their corresponding requirements, e.g., Table 5.3. The transmit emission requirement determiner component 40 may determine one or more coexistence modes 34 associated with a particular protection zone 16 by identifying the one or more other communications systems associated with the protection zone 16. For example, a CEN DSRC RSU 14 having the protection zone 16 may be associated with a first set of coexistence modes, and a second communication system may be associated with a different second set of coexistence modes. Further, the transmit emission requirement determiner component 40 may determine one or more applicable coexistence modes based on an intended transmission, for example, as defined by one or more applicable coexistence modes of ETSI TS 102 792. For example, the transmit emission requirement determiner component 40 may performing computations based on equation 5.1 or equation 5.2 for modes C and D, respectively.

$$T\text{off}(C) \geq (45 \times N)) \text{ ms} \qquad (5.1)$$

$$T\text{off}(D) \geq T\text{off}(C) + 15.4 \times N \times (T\text{on}-1 \text{ ms}) \qquad (5.2)$$

Toff may be a minimum time between two consecutive transmissions. N may be an assumed number of interfering ITS stations. For example, the UE 12 may estimate N based on geographical networking information. The transmit output power reduction determiner component 42 may determine whether intended transmissions within the protection zone comply with the Toff requirements of one of modes C and D. If so, the transmit output power reduction determiner component 42 may determine the allowed maximum transmit output power reduction based on the higher output power levels of coexistence modes C and D of table 5.3.

Further, at block 208, method 200 may include identifying, by the processor and based on being in the protection zone and the coexistence mode, one or more maximum transmit power requirements to be met. For example, in an aspect, processor 103 executing coexistence transmission management component 13 and/or transmit output power configuration component 36, including transmit emission requirement determiner component 40, is configured to identify, based on based on being in the protection zone and the coexistence mode, one or more maximum transmit power requirements to be met. For instance, transmit output power configuration component 36 may identify the allowed maximum transmit power based on the output power levels, levels, time on (Ton), and time off (Toff) as defined by one or more applicable coexistence modes of ETSI TS 102 792.

Additionally, at block 210, method 200 may include configuring, by the processor, a transmit output power, at which the UE can meet the one or more transmit emission limit requirements and the one or more maximum transmit power requirements. For example, in an aspect, processor 103 executing coexistence transmission management component 13 and/or transmit output power configuration component 36 is operable to configure transmit output power value 38 to meet the one or more transmit emission limit requirements and the one or more maximum transmit power requirements. In an aspect, the coexistence transmission management component 13 and/or transmit output power configuration component 36 may use a backoff from a maximum output power less than or equal to the allowed maximum transmit output power reduction or backoff, at which UE 12 can meet the emission requirements (See FIG. 3, example 1). In an alternative or additional aspect, the total power backoff allowance for UE 12 is a sum of a maximum power reduction (MPR; e.g., as defined by an LTE specification)+an additional MPR (A-MPR; as defined by an LTE specification)+the allowed maximum transmit output power reduction or backoff (as defined herein) (See FIG. 3, example 2). The processor 103 executing coexistence transmission management component 13 and/or transmit output power configuration component 36 may be operable to set the transmit output power to a value greater than or equal to a maximum output power minus the total power backoff allowance.

Further, at block 212, method 200 may optionally include transmitting a signal at the transmit output power value. For example, in an aspect, transceiver 106 and/or transmitter 134 may transmit a signal using transmit output power value 38. Transceiver 106 and/or transmitter 1354 may control RF front end 104 and/or PA(s) 145 to transmit the signal the transmit output power value.

Thus, UE 12 implementing method 200 may dynamically adjust transmission characteristics to meet highly localized and quickly changing transmission emission requirements, such as may be associated with a UE operating in an ITS system having CEN DSRC RSU 14 with one or more coexistence modes 34.

Figure 3:
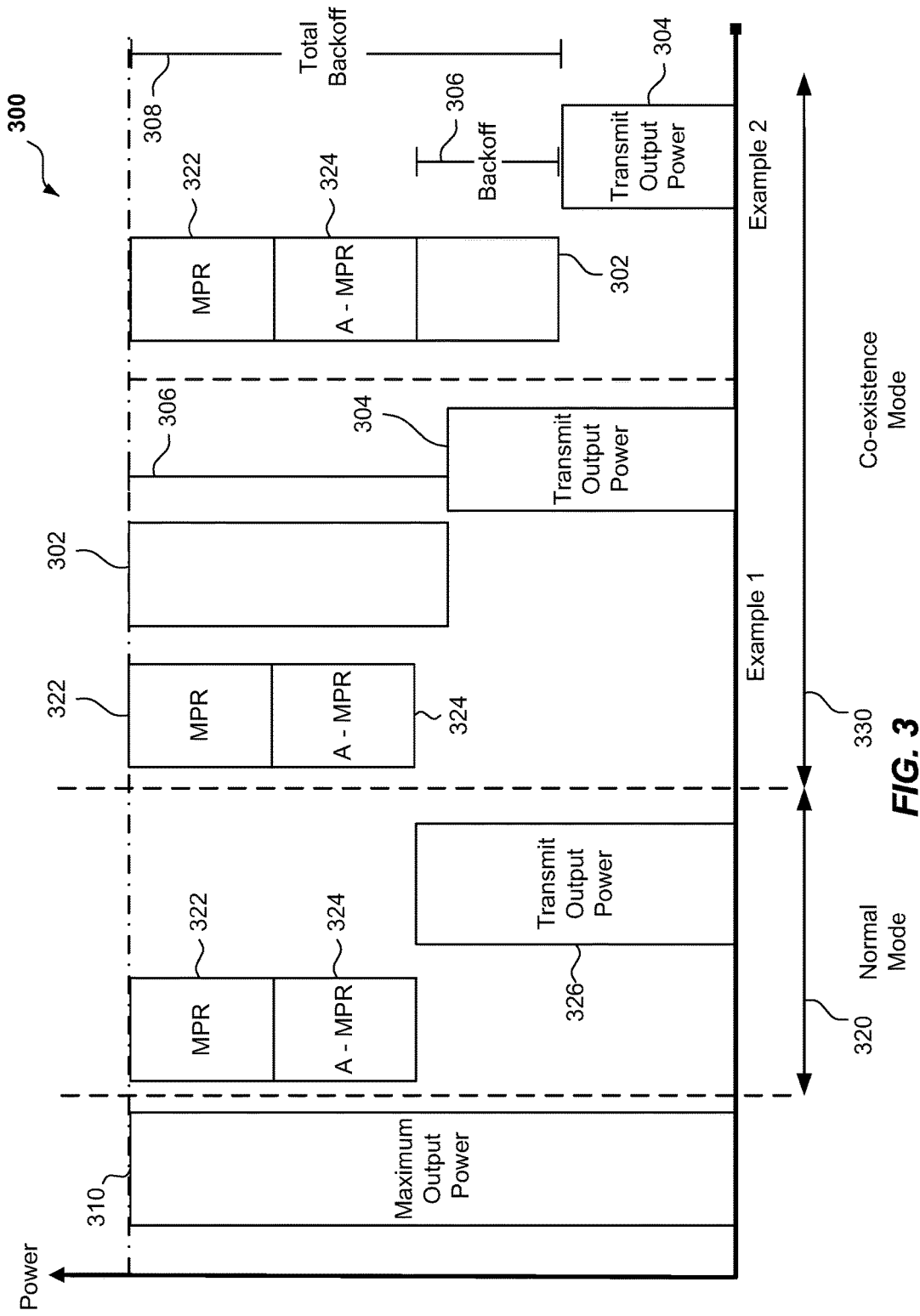
FIG. 3 is a graph of power versus operational mode (e.g., normal mode and co-existence mode) with respect to applying an allowed maximum transmit output power reduction in one implementation of a wireless communication system.

FIG. 3 is a graph 300 of power versus operational mode with respect to applying an allowed maximum transmit output power reduction or backoff 302 in one implementation of a wireless communication system, for example, at a UE 12. The allowed maximum transmit output power reduction or backoff 302 may be used to determine a transmit output power 304 at which the UE 12 can meet the one or more emission requirements.

The UE 12 may be configured with a maximum output power 310. The maximum output power 310 may be a preconfigured output power at which the UE 12 may operate. The maximum output power 310 may include a tolerance indicating an acceptable range over which a transmitter may operate when configured to output at the maximum output power 310. The UE 12, however, may not always transmit at the maximum output power 310.

For example, in a normal mode 320, the UE 12 may be subject to various regulations. For instance, a maximum power reduction (MPR) 322 may specify an allowed decrease in the maximum power transmitted in order to enable the UE 12 to pass transmitter adjacent channel leakage ratio requirements. The MPR 322 may be used, for example, to enable the UE 12 to allow various components (e.g., PAs 145) to operate in a linear region. The Additional Maximum Power Reduction (A-MPR) 324 may be used to comply with regional regulatory emissions requirements. For example, the A-MPR 324 may be based on an NS value signaled by the network entity 44. The UE 12 may apply the MPR 322 and the A-MPR 324 to the maximum output power 310 to determine a transmit output power 326 that satisfies the transmitter adjacent channel leakage ratio requirements and the regional regulatory emissions requirements.

In another aspect, in a coexistence mode 330, the UE 12 may alternatively or additionally apply the allowed maximum transmit output power reduction or backoff 302 302. For instance, in example 1, the UE 12 may configure a transmit output power 304, using a backoff 306 from maximum output power 310. The backoff 306 may be less than or equal to the allowed maximum transmit output power reduction or backoff 302. In cases where the MPR 322 and the A-MPR 324 are applied, e.g., in a coexistence mode, the backoff 306 may be applied alternatively or in addition to any backoffs associated with the MPR 322 and/or the A-MPR 324. In example, 2, a total backoff 308 may be a combination of the MPR 322, the A-MPR 324, and the allowed maximum transmit output power reduction or backoff 302 302. For example, the total backoff 308 may be a sum of the MPR 322, the A-MPR 324, and the allowed maximum transmit output power reduction or backoff 302.

Several aspects of a telecommunications system have been presented with reference to an LTE/LTE-A or a 5G communication system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several aspects of telecommunication systems have been presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. In some aspects, the computer-readable media may be non-transitory or include a non-transitory computer-readable storage medium.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of managing transmissions of a user equipment (UE), comprising:
    determining, by a processor of the UE, that the UE is in a protection zone where additional transmission requirements apply, the additional transmission requirements including one or more transmit emission limit requirements and one or more maximum transmit power requirements enabling coexistence with one or more other communication systems in the protection zone;
    identifying, by the processor and based on being in the protection zone and a coexistence mode, one or more transmit emission limit requirements to be met;
    identifying, by the processor and based on being in the protection zone and the coexistence mode, one or more maximum transmit power requirements to be met;
    determining, by the processor and based on the one or more transmit emission limit requirements and the one or more maximum transmit power requirements, an allowed maximum transmit output power reduction to be utilized by the UE to meet the one or more transmit emission limit requirements and the one or more maximum transmit power requirements; and
    configuring, by the processor, a transmit output power, at which the UE meets the one or more transmit emission limit requirements and the one or more maximum transmit power requirements, wherein configuring the transmit output power includes using a backoff from a maximum output power, wherein the backoff is less than or equal to the allowed maximum transmit output power reduction.

2. The method of claim 1, wherein determining that the UE is in the protection zone where the additional transmission requirements apply is based on additional information provided by a serving eNodeB.

3. The method of claim 1, wherein determining that the UE is in the protection zone where the additional transmission requirements apply is based on additional information preconfigured in the UE.

4. The method of claim 1, wherein determining that the UE is in the protection zone where the additional transmission requirements apply is based on additional information received from a device of the one or more other communication systems.

5. The method of claim 1, wherein a total power backoff allowance for the UE is a combination of a maximum power reduction (MPR), an additional MPR (A-MPR), and the allowed maximum transmit output power reduction.

6. The method of claim 5, wherein configuring the transmit output power comprises setting the transmit output power to a value greater than or equal to the maximum output power minus the total power backoff allowance.

7. The method of claim 1, further comprising determining the coexistence mode based on an intended transmission satisfying a time off requirement of the coexistence mode.

8. The method of claim 1, wherein determining, by the processor of the UE that the UE is in the protection zone includes determining that a geo-location of the UE is within the protection zone.

9. The method of claim 1, further comprising transmitting a signal at the transmit output power value.

10. A user equipment (UE) for wireless communications, comprising:
a transceiver;
a memory configured to store instructions; and
one or more processors communicatively coupled with the transceiver and the memory, wherein the one or more processors are configured to:
determine that the UE is in a protection zone where additional transmission requirements apply, the additional transmission requirements enabling coexistence with one or more other communication systems in the protection zone;
identify, based on being in the protection zone and a coexistence mode, one or more transmit emission limit requirements to be met;
identify, based on being in the protection zone and the coexistence mode, one or more maximum transmit power requirements to be met;
determine, based on the one or more transmit emission limit requirements and the one or more maximum transmit power requirements, an allowed maximum transmit output power reduction to be utilized by the UE to meet the one or more transmit emission limit requirements and the one or more maximum transmit power requirements; and
configure a transmit output power, at which the UE meets the one or more transmit emission limit requirements and the one or more maximum transmit power requirements using a backoff from a maximum output power, wherein the backoff is less than or equal to the allowed maximum transmit output power reduction.

11. The UE of claim 10, wherein the one or more processors are configured to determine that the UE is in the protection zone where the additional transmission requirements apply based on additional information provided by a serving eNodeB.

12. The UE of claim 10, wherein the one or more processors are configured to determine that the UE is in the protection zone where the additional transmission requirements apply based on additional information preconfigured in the UE.

13. The UE of claim 10, wherein the one or more processors are configured to determine that the UE is in the protection zone where the additional transmission requirements apply based on additional information received from a device of the one or more other communication systems.

14. The UE of claim 10, wherein a total power backoff allowance for the UE is a combination of a maximum power reduction (MPR), an additional MPR (A-MPR), and the allowed maximum transmit output power reduction.

15. The UE of claim 14, wherein the one or more processors are configured to set the transmit output power to a value greater than or equal to the maximum output power minus the total power backoff allowance.

16. The UE of claim 10, wherein the one or more processors are configured to determine the coexistence mode based on an intended transmission satisfying a time off requirement of the coexistence mode.

17. The UE of claim 10, wherein the one or more processors are configured to determine that the UE is in the protection zone based on determining that a geo-location of the UE is within the protection zone.

18. The UE of claim 10, wherein the transceiver is configured to transmit a signal at the transmit output power value.

19. A user equipment (UE) for wireless communications, comprising:
means for determining that the UE is in a protection zone where additional transmission requirements apply, the additional transmission requirements enabling coexistence with one or more other communication systems in the protection zone;
means for identifying, based on being in the protection zone and a coexistence mode, one or more transmit emission limit requirements to be met;
means for identifying, based on being in the protection zone and the coexistence mode, one or more maximum transmit power requirements to be met;
means for determining, based on the one or more transmit emission limit requirements and the one or more maximum transmit power requirements, an allowed maximum transmit output power reduction to be utilized by the UE to meet the one or more transmit emission limit requirements and the one or more maximum transmit power requirements; and
means for configuring a transmit output power, at which the UE meets the one or more transmit emission limit requirements and the one or more maximum transmit power requirements, wherein the means for configuring the transmit output power is configured to use a backoff from a maximum output power, wherein the backoff is less than or equal to the allowed maximum transmit output power reduction.

20. The apparatus of claim 17, wherein the means for determining whether the additional transmission requirements apply is based on additional information that is at least one of: provided by a serving eNodeB, preconfigured in the UE, or received from a device of the one or more other communication systems.

21. The apparatus of claim 19, wherein a total power backoff allowance for the UE is a combination of a maximum power reduction (MPR), an additional MPR (A-MPR), and the allowed maximum transmit output power reduction.

22. The apparatus of claim 21, wherein the means for configuring the transmit output power is configured to set the transmit output power to a value greater than or equal to the maximum output power minus the total power backoff allowance.

23. A non-transitory computer-readable medium, comprising code executable by one or more processors to configure a transmit output power of a user equipment (UE), comprising code to:
determine that the UE is in a protection zone where additional transmission requirements apply, the additional transmission requirements enabling coexistence with one or more other communication systems in the protection zone;
identify, based on being in the protection zone and a coexistence mode, one or more transmit emission limit requirements to be met;
identify, based on being in the protection zone and the coexistence mode, one or more maximum transmit power requirements to be met;

determine, based on the one or more transmit emission requirements, an allowed maximum transmit output power reduction to be utilized by the UE to meet the one or more transmit emission requirements; and configure a transmit output power, at which the UE meets the one or more transmit emission limit requirements and the one or more maximum transmit power requirements, wherein the code to determine the transmit output power, includes code to use a backoff from a maximum output power, wherein the backoff is less than or equal to the allowed maximum transmit output power reduction.

24. The non-transitory computer-readable medium of claim 23, further comprising code to determine whether the additional transmission requirements apply based on additional information that is at least one of: provided by a serving eNodeB, preconfigured in the UE, received from a device of the one or more other communication systems.

25. The non-transitory computer-readable medium of claim 24, wherein a total power backoff allowance for the UE is a combination of a maximum power reduction (MPR), an additional MPR (A-MPR), and the allowed maximum transmit output power reduction.

26. The non-transitory computer-readable medium of claim 25, further comprising code to set the transmit output power to a value greater than or equal to the maximum output power minus the total power backoff allowance.

* * * * *